United States Patent Office 3,305,851
Patented Feb. 21, 1967

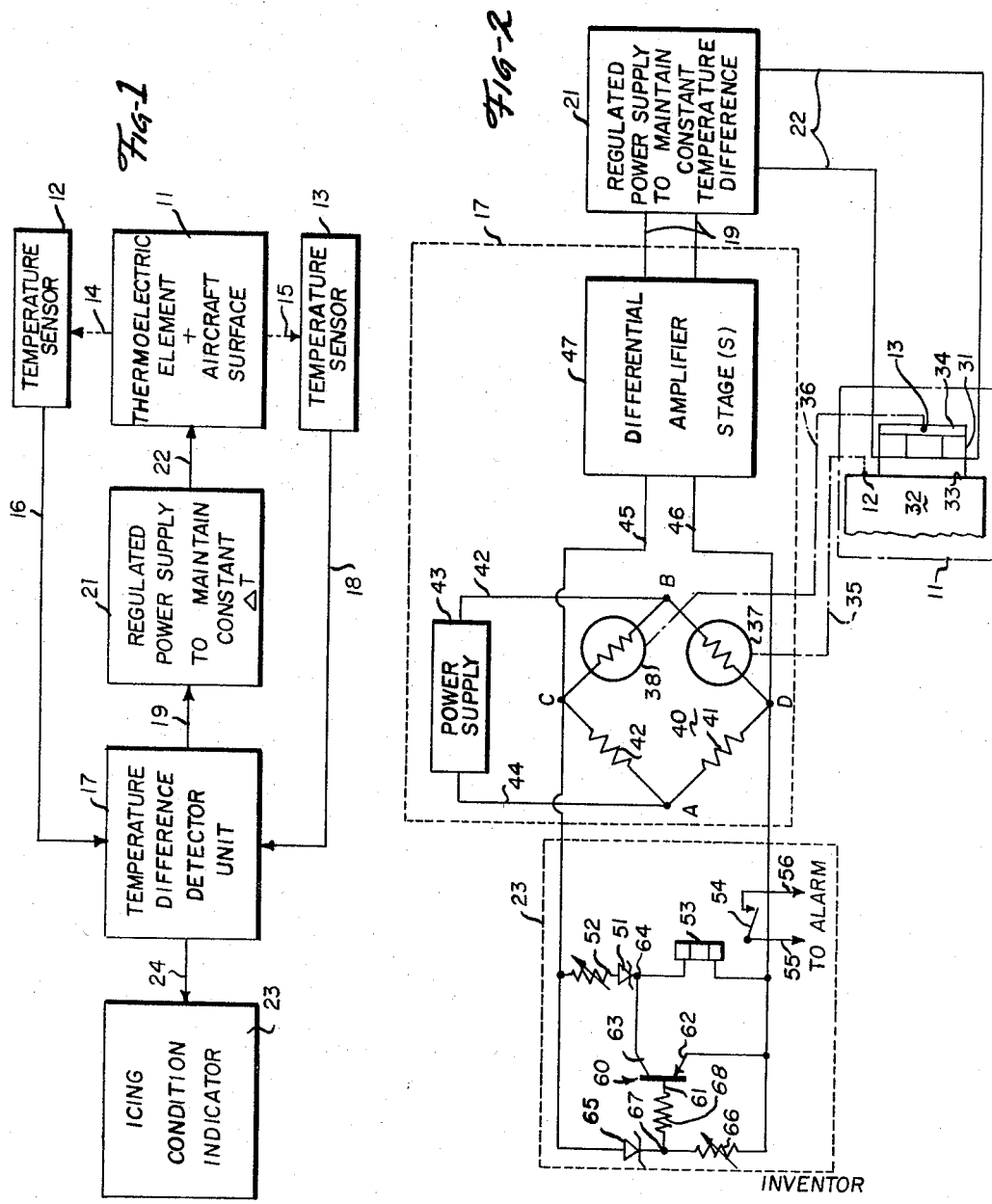

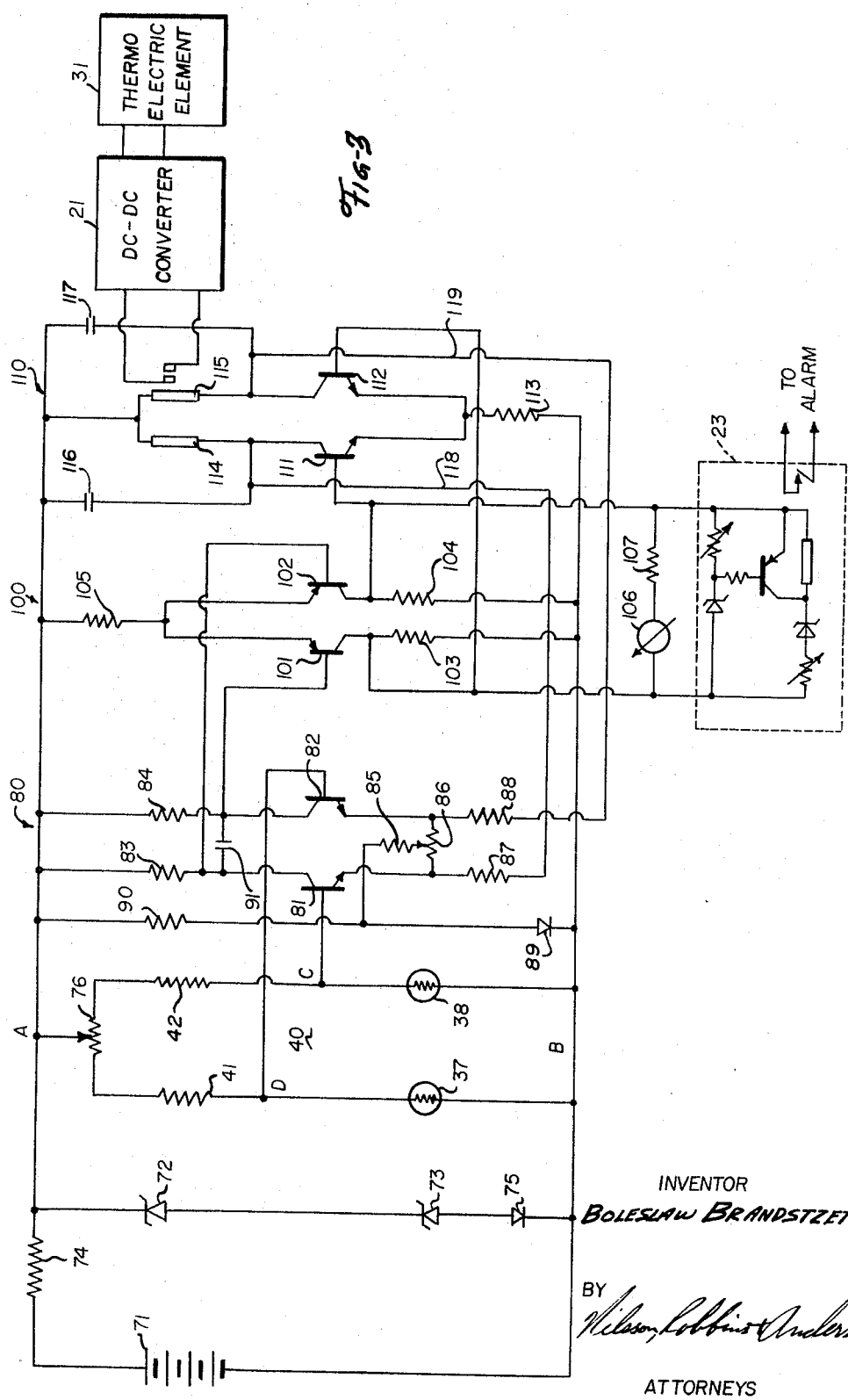

3,305,851
ICING CONDITION DETECTION APPARATUS
Boleslaw Brandtszteter, Los Angeles, Calif., assignor to Solid State Engineering Co., Los Angeles, Calif.
Filed Sept. 3, 1964, Ser. No. 394,197
6 Claims. (Cl. 340—234)

This invention relates generally to detectors responsive to predetermined ambient conditions and adapted to provide indications of such conditions. More particularly, the present invention, in its preferred application, detects the approach of icing conditions to which a particular aircraft would be subject and provides an indication thereof to the operator thus permitting corrective action to be taken prior to icing of the aircraft.

Prior art apparatus has been used for carrying out the object of icing condition detection. Although such apparatus does perform the intended object, it has been found to be extremely slow in response to a change in ambient atmospheric conditions, particularly those in which icing conditions are rapidly approaching. That is, a sudden change in atmospheric conditions showing the rapid approach of those conditions extremely favorable for the formation of ice upon various of the aircraft surfaces, would not be immediately reflected by the detection unit. Experience has in fact shown that under such rapidly changing conditions, the lag time of the prior art detector units is so great that icing has in fact already begun to occur prior to any indication thereof to the operator. Such operation presents obvious hazards to aircraft, payload, and operating personnel.

Furthermore, some prior art apparatus depends for operation upon the direct formation of an ice coating which covers openings to provide a pressure differential within a mechanical switch operating mechanism. Such apparatus is relatively heavy, is insensitive to foreign objects other than ice which might accidentally cover the openings, and is also subject to mechanical breakdown.

Accordingly, it is an object of the present invention to provide an ambient condition detector which overcomes disadvantages present in prior art apparatus.

It is another object of the present invention to provide an ambient condition detector which rapidly responds to changes in the ambient and also provides rapid indications of predetermined conditions thereof.

It is another object of the present invention to provide an ambient condition detector which is simple, rugged and uses a minimum of mechanical parts.

It is another object of the present invention to provide an ambient condition detector which is particularly adaptable for detection of aircraft icing conditions and is lightweight, is sensitive to only ice forming conditions, and is highly reliable.

Additional objects and advantages of the present invention both as to organization and operation will become apparent from a consideration of the following description taken in conjunction with the accompanying drawings which are presented by way of example only and are not intended as a limitation upon the scope of the appended claims, and in which:

FIG. 1 is a block diagram illustrating schematically an ambient condition detector and indicating unit in accordance with the present invention;

FIG. 2 is a schematic diagram partly in block form of an ambient condition detector and indicating unit in accordance with the present invention; and FIG. 3 is a schematic diagram of a preferred embodiment of an ambient condition detector and indicating unit in accordance with the present invention.

An ambient condition detector and indicating unit in accordance with the present invention and one which is specifically usable with aircraft for deduction and indication of the approach of icing conditions includes a thermo-electric element which is affixed to a desired surface of the aircraft such as the leading edge of the wing. The thermo-electric element has current passed therethrough to provide a predetermined temperature differential between each of the surfaces thereof according to the Peltier effect. Sensor elements are associated with the cold side, which is away from the aircraft surface, of the thermo-electric unit and with the aircraft surface with which the thermo-electric unit is associated. Circuit means including these sensor elements is provided to produce an electrical signal which is indicative of the temperature difference between the cold surface of the thermo-electric element and the surface of the aircraft. Indicator circuit means which is responsive to this electrical signal and particularly to its reaching a predetermined level indicating a temperature difference larger than that which has been predetermined is utilized to provide a warning or indicating signal of the approach of icing conditions.

Referring now to the drawing and more particularly to FIG. 1 there is illustrated in block diagram form a circuit for carrying out the above objects and advantages in an icing condition detector and indicator apparatus in accordance with the present invention. As was above pointed out, although the present invention is applicable for use with any number of apparatus wherever it is desired to detect a particular given set of ambient conditions, the present invention is particularly adapted for utilization with an aircraft for detecting the approach of icing conditions. Therefore, for purposes of clarity and ease of description, the following description will be given with respect to utilization of the present ambient condition detecting and indicating apparatus with an aircraft for the purpose of detecting the approach of icing conditions.

As illustrated in FIG. 1, a thermo-electric element is utilized in conjunction with an aircraft surface as indicated by block 11. The thermo-electric element may be any which is well known to the art and includes a P–N junction as a part thereof and which upon the passage of a current therethrough causes one surface thereof to be at a temperature which is different from the other surface thereof. The particular differential between the temperatures of the surfaces on opposite sides of the P–N junction is determined, within certain limits, by the amount of current which is passed across the P–N junction and can be used as a reference. In the presently preferred form of the present invention the thermo-electric element is placed in intimate contact with a surface of the aircraft where icing would normally occur. For example, the thermo-electric element may be directly affixed or embedded into the leading edge of one wing or alternatively within the cowling opening of an aircraft engine. The thermo-electric element is so affixed to the aircraft surface that the cold surface thereof is displaced from the actual surface of the aircraft by the thickness of the thermo-electric element and such that the hot surface of the thermo-electric element is in intimate contact with the aircraft surface. Thus, it is seen that the aircraft surface operates as a heat sink for the heated side of the thermo-electric element thus causing the heated side of the thermo-electric element to be substantially at the same temperature as is the designated surface of the aircraft to which the thermo-electric element is affixed, being the ambient temperature.

Temperature sensor devices 12 and 13 are interconnected with the thermo-electric element and the aircraft surface 11 as is indicated by the dashed lines 14 and 15 respectively. The temperature sensor 12 is associated with the cold surface of the thermo-electric element and for example, is embedded directly therein. The temperature sensor 13 is associated with the desired surface of the aircraft and for example, is embedded directly in the surface of the aircraft adjacent the thermo-electric element. In this manner the temperature difference between the cold surface of the thermo-electric element and the surface of the aircraft to which the thermo-electric element is affixed is constantly measured. The purpose of this measurement will become more apparent as this description ensues.

A lead 16 interconnects temperature sensor 12 with a temperature difference detector unit 17 while the temperature difference detector unit 17 and the temperature sensor 13 are interconnected by way of lead 18. The temperature difference detector unit may be any circuit which is capable of utilizing the differences in the temperature sensors 12 and 13 to provide an output signal which is indicative of this temperature difference. The output signal is applied in two directions. First, by way of lead 19 to the regulated power supply 21 to maintain the constant temperature difference which in turn is connected by way of lead 22 to the thermo-electric element 31 as is indicated. Alternatively and simultaneously the output signal from the temperature difference detector unit 17 is applied to an icing condition indicator 23 by way of the lead 24.

In operation, when the atmospheric conditions change in such a manner that ice forms upon the cold surface of the thermo-electric element, the temperature difference between the cold side of the thermo-electric element and the aircraft surface varies drastically and rapidly. This sudden change in temperature difference is detected by the temperature difference detector 17. This difference signal operates in such a manner that a signal is applied to the icing condition indicator, thus causing the operator of the aircraft to receive a signal that icing conditions are approaching. Upon the receipt of this signal the aircraft operator can take whatever corrective action appears to be proper under the circumstances. Simultaneously, the regulated power supply responds to the large difference in temperature by cutting off power to the thermo-electric element since the application of current thereto is no longer needed to maintain a particular temperature difference since the temperature difference to which the power supply has been adjusted has been exceeded substantially. This will be more fully explained below.

So long as the icing condition present in the ambient atmosphere exists, the coating of ice remains on the cold surface of the thermo-electric element thus providing a constant signal to the operator that the condition continues to exist. It, of course, is possible that the icing condition indication signal can be used not only to provide an indication to the aircraft operator, but also to actuate other electrical mechanism to place into effect de-icing apparatus associated with the aircraft.

Referring now more particularly to FIG. 2, the apparatus of the present invention is illustrated somewhat in more detail. As illustrated in FIG. 2 within the dashed line 11, the thermo-electric element 31 is affixed to the leading edge 33 of the aircraft wing 32 which is schematically illustrated. The leads 22 from the regulated power supply 21 apply current across the P-N junction of the thermo-electric element 31. The cold surface 34 of the thermo-electric element 31 is spaced from the surface 33 of the wing 32 of the aircraft. As was above pointed out, the current flowing through the thermo-electric element 31 causes the surface 34 thereof to be colder than the surface which is affixed directly to the leading edge 33 of the wing structure 32. As is illustrated, the temperature sensor 12 is embedded directly in the leading edge 33 of the aircraft wing and thus senses the ambient conditions that the leading edge 33 of the aircraft wing experiences. The temperature sensor 13 however is embedded directly in the cold surface 34 of the thermo-electric element 31 and thus senses its temperature. Since the surface 34 of the thermo-electric element 31 is somewhat colder by a predetermined amount than is the leading edge 33 of the wing structure 32, ice will form first upon the cold surface 34 of the thermo-electric element 31. As is indicated by the dashed lines 35 and 36 the temperature sensors 12 and 13 respectively are included as a part of a difference bridge illustrated generally at 40 and specifically as seen by the encircled resistive elements 37 and 38 respectively. The difference bridge 40 forms a part of the temperature difference detector unit 17 as enclosed in the dashed lines.

The difference bridge 40, in addition to the temperature sensor elements 37 and 38, also includes a pair of resistors 41 and 42 which form respectively one arm of the difference bridge. A power supply 43 is connected by way of leads 42 and 44 across the input points A and B of the difference bridge 40. The output points C and D of the difference bridge 40 are connected by way of the leads 45 and 46 to a differential amplifier stage or stages 47. The output of the differential amplifier stage or stages 47 is in turn connected by way of the leads 19 to the regulated power supply 21 as above described. The combination of the bridge 40 and the differential amplifier or amplifiers 47 is adjusted in such a manner that so long as the temperature difference between the cold surface 34 of the thermo-electric element 31 and the leading edge 33 of the wing 32 is at a predetermined level, for example, on the order of two to three degrees centigrade, the output signal appearing at points C and D is equal and therefore the difference between them is zero. The difference between the signals being zero, the differential amplifier output will also be zero and the current applied to the thermo-electric element is cut off. As the temperature difference between the cold surface 34 and the leading edge 33 then becomes less, an output signal across the points C and D is developed and an output signal is experienced from the differential amplifier. The output signal is applied by leads 19 to the regulated power supply 21 which in response thereto applies current to the thermo-electric element 31 thus causing the temperature difference to return to the desired point, which has been previously set. During this type of operation, the icing condition indicator 23 provides no alarm signal.

In the event that the atmospheric conditions associated with the aircraft as defined by the air pressure, the temperature, the dew point, the speed of the aircraft and the frictional heating is such that icing conditions are being approached, the cold side of the thermo-electric element will first be exposed to these conditions and to the formation of ice simply because it is maintained at a lower temperature than is the surface 33 of the wing 32. The greater this temperature difference, the earlier the cold surface 34 will be exposed to the formation of ice and the greater amount of time the aircraft operator will have to take corrective action. It has, however, been determined that if a difference on the order of two to three degrees centigrade is maintained, ample opportunity is given to take the desired corrective action.

Should these atmospheric conditions exist, a thin film of ice then forms upon the surface 34 of the thermo-electric element 31. As is well known, ice operates as an excellent insulator; thus, the temperature of the cold surface 34 abruptly drops upon the formation of the ice layer thus causing a large temperature difference between the surface 34 on the thermo-electric element 31 and the surface 33 of the wing structure 32. This abrupt drop in temperature and large incremental difference greatly exceeds the predetermined temperature difference which as been preset as above indicated. The output signal which appears across the bridge at points C and D is applied to the differential amplifier or amplifiers 47 and in turn to the regulated power supply 21. The temperature difference being much greater than that previously preset causes the output signal from the differential amplifiers to cut off the current flowing through the thermo-electric element 31. Since the current is no longer needed to maintain the predetermined temperature at a given point, the further application of current to the thermo-electric element would only tend to make the cool surface even more cool and thus the temperature difference greater.

At the same period of time the output signal appearing at points C and D across the bridge is also applied to the icing condition indicator set forth in the dashed block 23. If the voltage signal appearing across output points C and D of the bridge 40 exceeds a predetermined value, the alarm circuit is actuated. This predetermined value is established to differentiate from other conditions which may cause a difference in temperature such as dust, rain or other foreign matter which may come into contact with the surface 34 of the thermo-electric element 31. It has been found that the formation of ice will cause a rise to a predetermined value and that the ice being formed and continuing to remain upon the surface 34 will always cause the temperature difference appearing across the points C and D of the bridge 40 to be greater than this value but less than a second predetermined value. Therefore, the indicator device must be capable of sensing when the output signal appearing at points C and D of the bridge is above the first predetermined value but does not exceed the second predetermined value. This is accomplished by the circuit indicated within the dashed block 23 in FIG. 2.

As is illustrated in FIG. 2 the detector for the first predetermined level of output signal includes a Zener diode 51 which is connected in series with a resistor 52 which, as is indicated, may be variable and the coil of a relay 53. The contacts 54 of the relay 53 which as is indicated in this specific example are normally open are connected by way of leads 55 and 56 to an alarm apparatus which may be visual, audible or as otherwise desired and is observable by the aircraft operator. This portion of the circuit operates in the following manner. When the voltage appearing across the points C and D of the bridge 40 exceeds a first predetermined value as established primarily by the breakdown point of the Zener diode 51, the diode 51 then breaks down and current flows through the series circuit consisting of the diode 51, the resistor 52 and the relay coil 53 as above described. Relay coil 53 is then energized actuating the contacts 54 and setting the alarm adjacent the operator into actuation. There is thus provided an indication that icing conditions are approaching for the aircraft, and that, in fact, ice has formed upon the leading edge of the thermo-electric element 31.

The second portion of the indicating circuit consists of a transistor indicated generally at 60 and including a base 61, an emitter 62 and a collector 63. The collector 63 is connected at a common point 64 between the Zener diode 51 and the relay coil 53 previously described. The emitter 62 is connected to the point D of the bridge 40. A second Zener diode 65 is connected in series with a resistor 66 which as is indicated may be variable and this series combination is connected across the output of the bridge C, D. The common point 67 between the Zener diode 65 and the resistor 66 is connected by way of a resistor 68 to the base 61 of the transistor 60. This portion of the circuit operates as follows. As the voltage appearing across the output points C and D of the bridge 40 exceeds a predetermined second value which is greater than the first predetermined value, the Zener diode 65 breaks down and current flows therethrough. At this point, a bias is applied to the base 61 of the transistor 60 such that the base emitter diode thereof is forward biased, thus causing the transistor 60 to begin to conduct. Preferably, transistor 60 will go from a non-conducting high impedance state upon the application of this signal, to a saturated conducting very low impedance state which is substantially a short circuit as compared to the impedance of the relay coil 53. This causes the relay coil 53 to be effectively shorted out, thus causing the alarm circuit to be opened causing the contacts 54 to return to their normally open condition. When such occurs, the operator is informed that icing conditions have, in fact, not been encountered by the aircraft. It is thus seen that the icing condition detector in accordance with the present invention is sensitive only to the formation of a film of ice upon the cold surface 34 of the thermo-electric element 31.

A preferred embodiment of a circuit particularly adaptable for utilization with aircraft in order to detect the icing conditions thereon is illustrated in FIG. 3 to which reference is hereby made.

Referring now to FIG. 3, where the preferred embodiment of a circuit in accordance with the present invention is illustrated there is shown a source of direct current potential 71. A pair of Zener diodes 72 and 73 are connected in shunt with the source of potential 71. A resistor 74 is connected in series with the Zener diodes and the source of potential 71 and is a current limiting resistor. The Zener diodes 72 and 73 are utilized to stabilize the voltage which is applied to the remainder of the circuit. A diode 75 is connected in series with the Zener diodes and is used to temperature compensate the breakdown voltage of the Zener diodes.

The bridge circuit 40 as described in conjunction with FIG. 2 above, is connected across the power supply at points A and B as previously described. Since the bridge has been thoroughly described above, no further discussion thereof will be given at this point with the exception of the notation of a variable resistor 76 which is connected between the fixed resistors 41 and 42 for the purpose of balancing the bridge and setting the predetermined temperature difference between the cold and hot sides of the thermo-electric element 11 as above described. The output signal of the bridge 40 is applied as an input signal to a first stage of amplification 80 which in its preferred form is a differential amplifier. The differential amplifier 80 is of the type well known to the art and includes a transistor 81 and a transistor 82. A pair of identically valued load resistors 83 and 84 are connected between the collectors of the transistors 81, 82 respectively and one side of the power supply. A common emitter resistor 85 is connected through a balancing potentiometer 86 to the two emitters of the transistors 81 and 82. The ouput points C and D of the bridge 40 are connected as outputs to the bases of the transistors 81 and 82 respectively. A pair of resistors 87 and 88 are also connected to the emitters of the transistors 81 and 82 respectively and are used for the purpose of injecting a feedback signal into the emitters of the two transistors 81 and 82. The feedback signal is generated from the last stage of amplification which will be described more fully hereinafter. The common emitter resistor 85 is connected to the opposite terminal of the power supply through the temperature compensating diode 89 which is connected in series across the power supply with a current limiting resistor 90. A capacitor 91 is connected across the collector electrodes of the two transistors 81 and 82 in order to shunt any sharp transients and preclude their application to additional and further stages of amplification.

The output of the differential amplifier stage 80 is supplied as an input signal to a second stage of amplification 100 which also in the presently preferred embodiment of the present invention is a standard differential amplifier stage. This differential amplifier 100 includes a pair of transistors 101 and 102. These transistors as will be noted are of the opposite type from transistors 81 and 82. That is, transistors 81 and 82 are N-P-N transistors while transistors 101 and 102 are P-N-P transistors. A pair of identically valued load resistors 103 and 104 are connected in the collector circuit of the transistors 101 and 102 respectively and to one terminal of the power supply while a common emitter resistor 105 is connected between the two emitters of the transistors 101 and 102 and the opposite terminal of the power supply.

The output signal of the second stage 100 of amplification is applied as an input signal to the third stage 110 of amplification which again is a standard differential amplifier and includes a pair of transistors 111 and 112. These transistors are again of the N-P-N type. A common emitter resistor 113 is connected from the emitters of the two transistors 111 and 112 to one side of the power supply. In this instance the load which is connected between the collectors of the two transistors 111 and 112 and the opposite side of the power supply is a pair of identical relay coils 114 and 115. These relay coils are of such a design, and are referred to typically as a differential relay, to provide an identically valued load in each of the collector circuits. The relay contacts of relay 115 are normally closed thus supplying power to the D.C. to D.C. converter 21 which is of a type and operates as is well known in the prior art and may be regulated as desired to provide a predetermined amount of current flow to the thermo-electric element 31. Since D.C. to D.C. converters are presently well known in the art, no additional reference or description thereof will be given. The thermo-electric element 31 was fully discussed in the preceeding description and will not be further described at this point. A pair of capacitors 116 and 117 shunt the relay coils 114 and 115 respectively for the purpose of filtering out any sharp voltage peaks created as a result of change of current flowing through the coils 114 and 115. A feedback signal is applied by way of leads 118 and 119 to the emitters of the input transistors 81 and 82 through the feedback resistors 87 and 88. The feedback applied is negative thus tending to stabilize the three stages of amplification.

Connected across the output of the second stage of amplification 100, is the icing condition indicator 23 as was clearly and fully described in conjunction with the description of FIG. 2 and thus further description thereof will not be given at this time. However, it should be noted that there is one additional element which has been included in the indicating circuit. It should be noted that the alarm as previously described is an on-off type of apparatus such that the pilot is informed that icing conditions are in existence or alternatively, that they are not. There was no way provided for the pilot to have any indication as to the speed with which the icing condition is in fact approaching or worsening. As indicated in FIG. 3, there is provided a meter 106 connected in series with a resistor 107 across the output of the amplification stage 100. The meter is a typical ammeter which can be calibrated in terms to shown the severity of the icing condition as it approaches. Thus, by viewing the ammeter, the operator of the aircraft can determine the magnitude of the temperature differential between the two temperature sensors 37 and 38 which are operating in conjunction with the thermo-electric element 31.

It is not thought that a detailed description of the functioning and operation of each of the stages of differential amplification is needed since differential amplifiers are old and well known in the prior art. Reference is however, made to the book Differential Amplifiers, by R. D. Middlebrook, published by John Wiley & Sons, Inc., New York, N.Y., 1963.

Generally speaking, the differential amplifier will not detect or amplify any signal except one which indicates a difference between the two input signals applied thereto. Thus in the present instance when the temperature difference between the cold and hot surfaces of the thermo-electric element is such that the temperature sensors indicate a difference in accordance with that which has been preset by the potentiometer 76 as above indicated, no input signal is applied to the differential amplifier stage 80 and the relay 115 will open removing power from the thermo-electric element 31. When the difference is less than that which has been preset, the relay 115 is not energized, thus applying power to the thermo-electric element to cause the temperature differential to again go back to the difference as previously set. Upon the formation of a layer of ice on the thermo-electric element as previously described, the temperature between the cold and hot sides of the thermo-electric element suddenly increases, the cold side temperature falling drastically, thus causing the resistane to the temperature sensor 38 to change drastically. The amplifier stage 80 thus sees a large difference between the signals present between the two bases of the transistors 81 and 82 and applies a large output signal to the second stage 100 which in turn applies a large output signal to the third stage 110 which causes the relay 115 to again energize and remove the power from the thermo-electric element 31. Simultaneously, if the difference is such that the output signal appearing at the amplifier stage 100 is greater than the first predetermined value as above described the relay within the indicator unit 23 actuates providing an alarm to the operator of the aircraft so that corrective action may be taken.

From the foregoing description, it should become apparent that one important feature of the present invention is that the temperature which is detected is the difference temperature between the cold and hot side of the thermo-electric element or actually between the cold side and the reference surface of the aircraft. Thus since it is the difference temperature, which is always detected and used as the reference point of operation of the circuit, the circuit is sensitive, irrespective of the ambient temperatures or other conditions, and irrespective of radical changes therein, to the detection of icing conditions.

There has thus been described an ambient condition detecting apparatus which is sensitive over a predetermined range which is simple, rugged and fast acting in all instances thus providing a more reliable apparatus for the detection of such conditions, for example, as that of icing where aircraft is concerned. Although a specific circuit has been illustrated and described in the foregoing specification and a particular application thereof has been referred to, it is to be expressly understood that the appended claims are not to be limited thereby.

What is claimed is:

1. Apparatus sensitive to changes in preselected ambient conditions surrounding a preselected surface area for providing a warning of the approach of icing conditions comprising:
   first means for detecting a change in said ambient conditions including,
      a thermo-electric element having a hot surface, a cold surface and a P-N junction, the hot surface thereof contacting said preselected surface,
      a source of current connected to said thermoelectric element for maintaining the temperature difference between the hot and cold surfaces thereof equal to or greater than a predetermined amount, and
   second means for indicating the attainment of icing conditions including,
      temperature sensor elements disposed adjacent said hot and cold surfaces of said thermoelectric element, circuit means including said sensor elements and responsive to changes therein to provide an electrical signal, and indicator means responsive to said electrical signal reaching a predetermined magnitude to provide a warning that said preselected ambient conditions have been reached.

2. Apparatus as defined in claim in which one of said temperature sensor elements is in intimate contact with the cold surface of said thermo-electric element and the other sensor element is in intimate contact with said preselected surface.

3. A detector of changes in ambient conditions surrounding a preselected surface to indicate the approaching of icing conditions comprising:
a thermo-electric element having first and second spaced apart surfaces separated by a P-N junction, power supply means connected to said first and second surfaces to supply electrical current to said thermo-electric element whereby said first surface is maintained at a temperature lower by at least a predetermined amount than said second surface, said second surface being adapted for attachment to said preselected surface;
first and second temperature sensor elements, one of which is disposed adjacent said first surface of said thermo-electric element and the other of which is disposed adjacent said preselected surface; and
circuit means including said sensor elements for detecting the difference in temperature between said first and second surfaces of said thermo-electric element and for providing a signal only in response to said difference in temperature exceeding a predetermined value, said predetermined value being established by the formation of ice upon said first surface of said thermo-electric element.

4. A detector of changes in ambient conditions surrounding a preselected surface to indicate the approach of icing conditions comprising:
a thermo-electric element having first and second spaced apart surfaces separated by a P-N junction, power supply means connected to said first and second surfaces to supply electrical current to said thermo-electrical element whereby said first surface is maintained at a temperature lower by at least a predetermined amount than said second surface thereby to establish a temperature difference reference level, said second surface being adapted for attachment to said preselected surface;
first and second temperature sensor elements one of which is disposed adjacent said first surface of said thermo-electric element and the other of which is disposed adjacent said preselected surface;
a bridge circuit including said temperature sensor elements for producing an output signal indicative of the temperature difference between said first and second surfaces of said thermo-electric element;
circuit means including a power supply connected between said bridge circuit and said thermo-electric element to provide current to said thermo-electric element only when the temperature difference between the surfaces thereof is less than said temperature difference reference level; and
indicator means connected to said circuit means and responsive only to the output signal from said bridge circuit being between a lower and an upper level for providing an indication of the approach of predetermined ambient conditions, said first level being established by the temperature difference between said first and second surfaces exceeding said reference level by an amount sufficient to form ice on said first surface of said element and said second level being established by said temperature difference exceeding said reference level by an amount greater than that temperature difference established by a layer of ice formed on said first surface and remaining thereon for a period of time sufficient to cause said temperature difference to be substantially constant.

5. A detector in accordance with claim 4 in which said temperature sensor elements are positive temperature coefficient resistance elements and said circuit means includes an amplifier.

6. A detector in accordance with claim 5 in which said indicator means further includes a circuit responsive to the rate of change of the difference signal to provide an indication of the rapidity of approach of ambient conditions favorable to the formation of ice.

References Cited by the Examiner
UNITED STATES PATENTS 2,656,525 10/1953 Kinsella _____ 340—234
3,121,998 3/1964 Negata _____ 62—3
3,229,271 1/1966 Frant _____ 340—234

NEIL C. READ, *Primary Examiner.*

D. L. TRAFTON, *Assistant Examiner.*